United States Patent Office 2,879,434
Patented Mar. 24, 1959

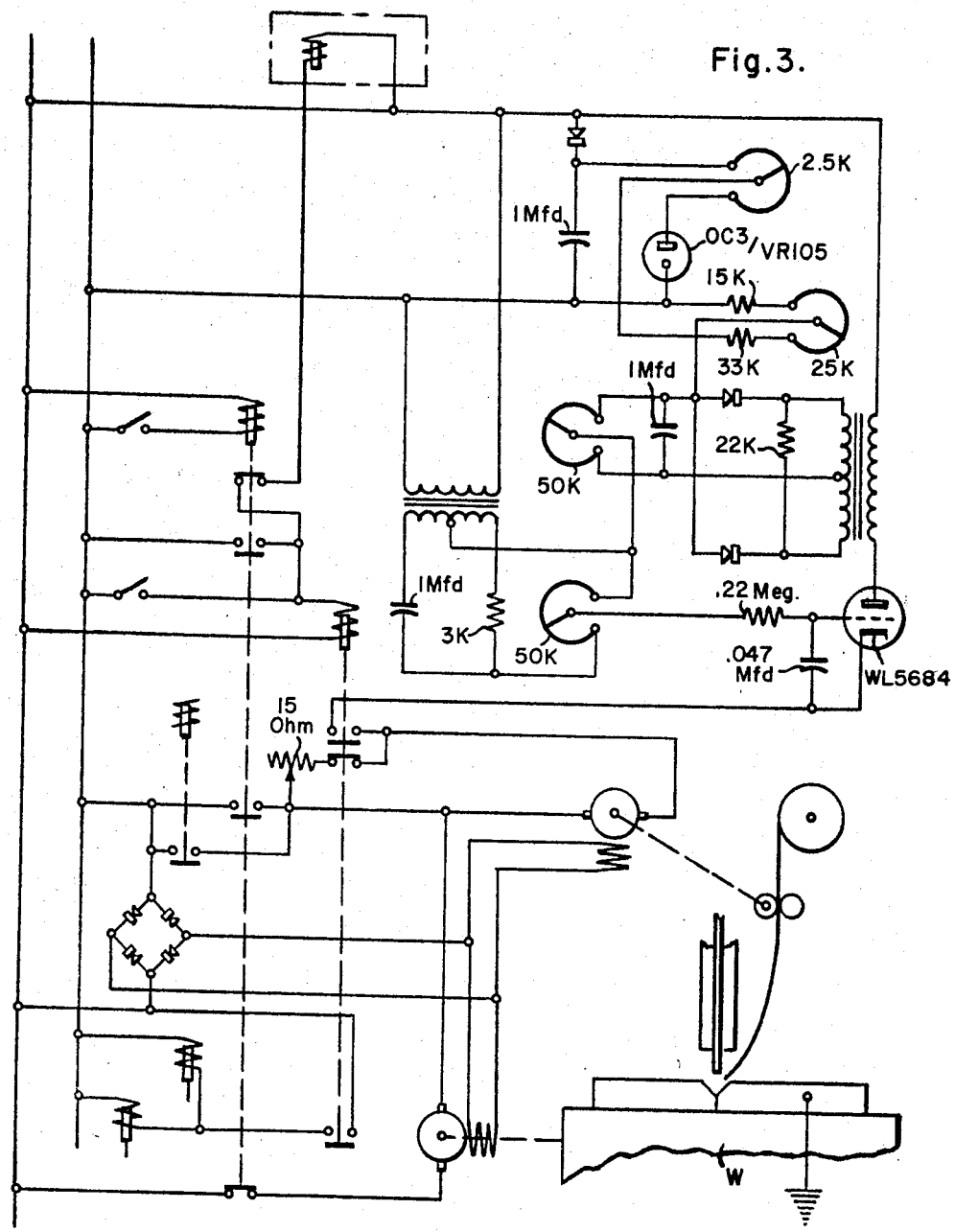

2,879,434

ARC WELDING APPARATUS

Harry J. Bichsel, East Aurora, and Alfred J. Baeslack, Clarence, N.Y., assignors to Westinghouse Electric Corporation, East Pittsburgh, Pa., a corporation of Pennsylvania Application June 18, 1957, Serial No. 666,335

7 Claims. (Cl. 314—71)

This invention relates to the art of arc welding and has particular relation to arc welding with a non-consumable electrode where a filler material in the form of a continuous wire is fed by a motor to the arc or to welding with a consumable electrode which is fed by a motor.

In certain critical situations in which materials are to be joined by arc welding, severe demands are imposed. In one typical situation, parts of stainless steel (specifically No. 347 stainless steel), are to be joined by welding on only one side of the parts with no back-up behind the parts. The power supply available for welding may vary in voltage by as much as plus or minus 10%. It is required that the weld penetration be 100%, that no weld metal protrude more than 1/32 inch from the rear of the joint and that there be no cracks in the rear of the joint.

With prior art apparatus, welds meeting these requirements could not be made and it is broadly an object of this invention to provide arc welding apparatus with which sound welds shall be readily produced even in situations in which the demands are as critical as just described.

A specific object of this invention is to provide a novel motor control circuit having general utility but being particularly suitable for controlling the electrode drive of arc-welding apparatus capable of producing welds subjected to rigorous requirements.

This invention arises from the realization that the difficulties encountered in welding in critical situations with prior art apparatus arises from variations in the potential of the supply from which the motor is energized. These variations produce corresponding variations in the speed of the motor which drives the welding electrode or filler wire and in the speed of the electrode or wire and in the rate of deposit of weld metal. This militates against precise deposit of weld metal.

The electrode or wire is advanced by a direct current motor which is supplied from an alternating current source through the anode cathode-circuit of a discharge device, preferably a thyratron. In the control circuit of this thyratron, a composite control potential is impressed, which includes an A.C. bias component, a direct-current component substantially proportional to the motor current, the potential across the armature of the motor and an adjustable direct-current potential which is set at the will of an operator to set the motor or electrode speed. The motor-current-proportional component is set to compensate for the I-R drop across the motor. It is usually desirable that the adjustable component be capable of setting the speed of the motor over a 5 to 1 range. The polarities of the motor-current-proportional component and the adjustable component are such that they counteract or balance the potential across the armature.

The adjustable direct-current component is derived from the alternating supply through a rectifier. It has been found that the potential of the alternating supply may vary by as much as plus or minus 10% and the adjustable component varies correspondingly at each setting. Since the adjustable component has an amplified effect on the conductivity of the thyratron, it is to be expected that the electrode speed will be markedly affected by the supply potential variations.

An attempt was made to compensate for the supply potential variations completely by full regulation of the adjustable potential, for example, by deriving the adjustable potential from an impedance connected between the terminals of a regulator tube. This expedient proved unsuccessful.

It was discovered that effective control of the motor is achieved not by compensating completely for the effect of variations in the supply potential on the adjustable potential component in the control circuit of the thyratron but by compensating partially to a measured extent for such variations. In accordance with this invention, then, arc-welding apparatus is provided in which the effects of potential variations on the electrode-or-wire-drive-motor arising from the adjustable direct-current component of the control potential of the thyratron through which the motor is supplied are partially compensated. This partial compensation is effected in accordance with a specific aspect of this invention by deriving the adjustable potential component from a series network including a variable resistor and a regulator, the variable resistor being set so that the motor speed fluctuations are a minimum.

The novel features considered characteristic of this invention are disclosed generally above. The invention itself, both as to its organization and as to its method of operation together with additional objects and advantages thereof, will be understood from the following description of a specific embodiment when read in connection with the accompanying drawings, in which:

Fig. 3 is a circuit diagram similar to that shown in Fig. 2 which presents the magnitudes of actual apparatus constructed and found to operate highly satisfactorily.

Figure 1:
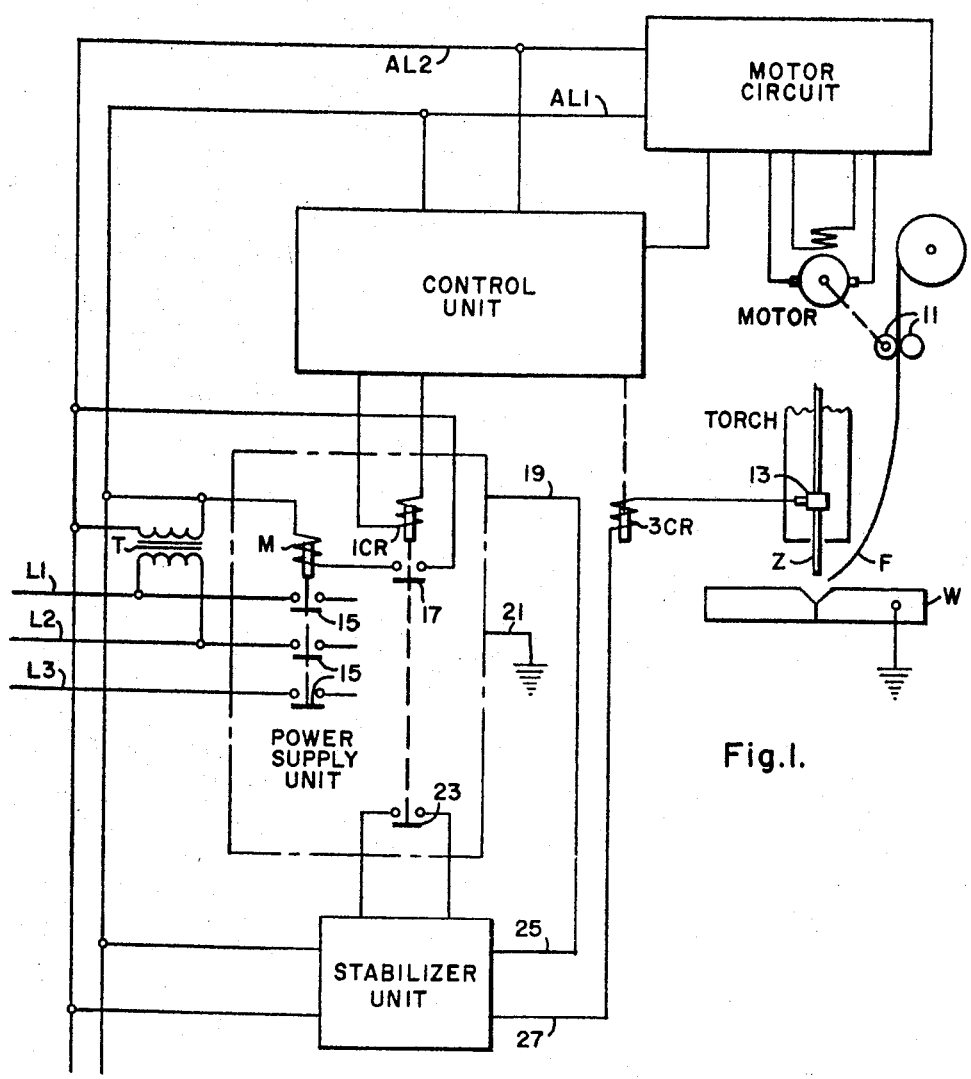
Figure 1 is a blocked diagram showing a preferred embodiment of this invention.
Figure 2:
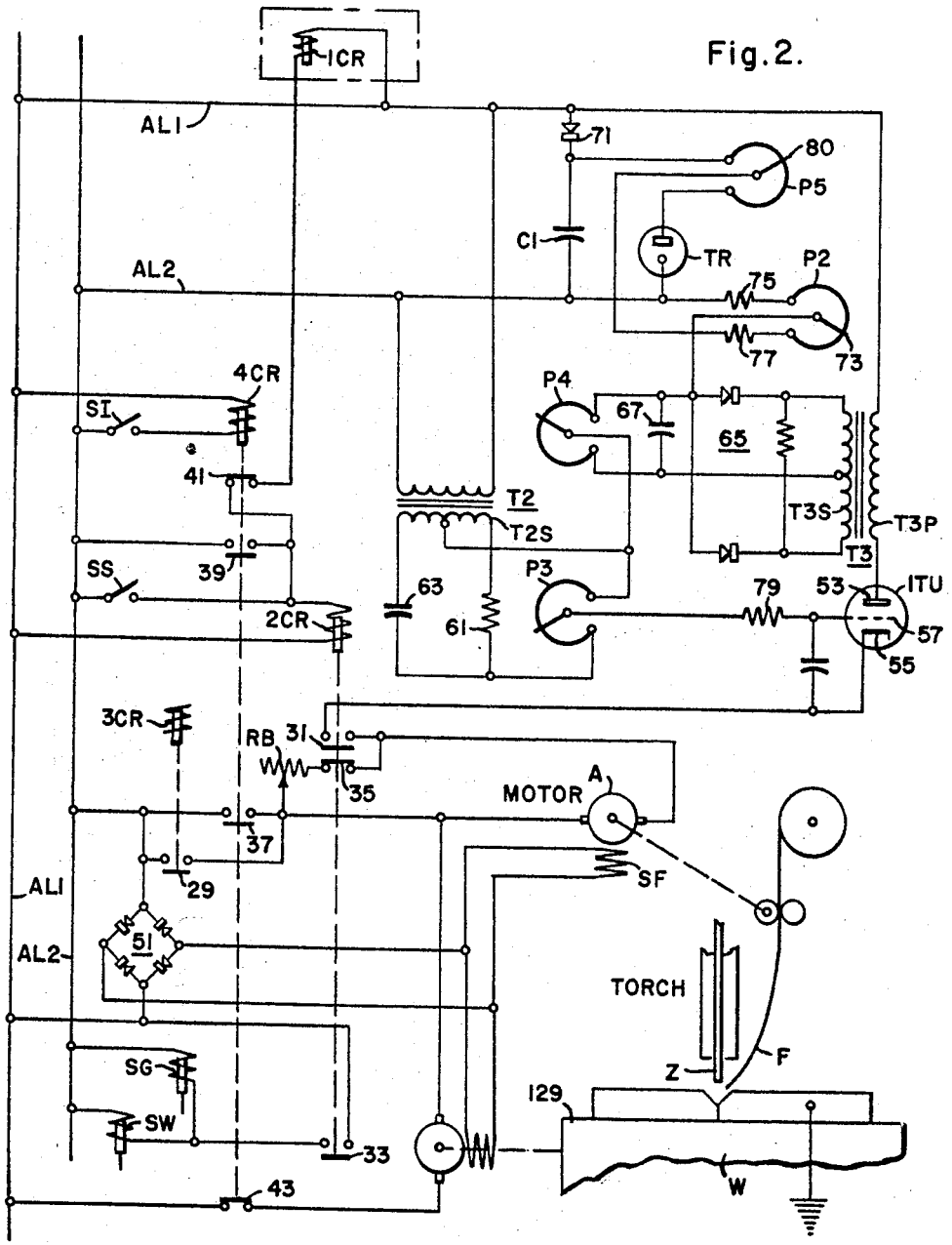
Fig. 2 is a circuit diagram of the embodiment shown in Fig. 1.

The component magnitudes of Fig. 2 are presented in an effort to help those skilled in the art in practicing this invention and not with any intention of in any way restricting the scope of this invention.

The apparatus shown in the drawing includes a welding Torch, a Power Supply Unit, a Stabilizer Unit, a Control Unit, a Motor and a Motor Circuit. The apparatus is supplied with potential from main conductors L1, L2, L3 which are adapted to be connected to a commercial polyphase supply through the usual disconnects or circuit breakers (not shown). The apparatus is also supplied from auxiliary conductors AL1 and AL2 which derive this power from conductors L1 and L2 through a transformer T.

The Torch is preferably of the non-consumable type having means for holding a non-consumable electrode Z. In addition, the Torch includes facilities for supplying cooling water and shielding gas (not shown). The Torch is mounted with the arcing tip of the electrode Z adjacent to work W. A filler wire F is supplied to the region of the arc by a Motor which drives the filler wire F through driving rolls 11. The driving rolls 11 must be in firm positive driving engagement with the wire F. The Torch is provided with a brush 13 which engages the electrode Z so that potential may be impressed between the electrode Z and the work W.

The Power Supply Unit may be of any suitable type available in the art. In the typical situation described above, the unit is of the constant current type, specifically a Westinghouse RA welder. The Unit may also be of the constant potential type used as a Westinghouse CPRA. The Power Supply Unit may be energized from conductors L1, L2, L3 through the contacts 15 of contactor M. The coil of contactor M is adapted to be connected between conductors AL1 and AL2 through a contact 17 of relay 1CR which is controlled from the Control Unit. When relay 1CR is energized the Power Supply Unit is energized. When the Power Supply Unit is energized, potential appears between its output conductors 19 and 21. Conductor 21 is connected to ground and thus to the work which is also grounded.

The Stabilizer Unit may be of any suitable type available in the art. Thus Unit may be energized from conductors AL1 and AL2 by the closing of another contact 23 of relay 1CR. The Stabilizer Unit has output conductors 25 and 27 through which a high frequency potential is impressed in series with conductor 19.

Conductor 19 and the output of the Stabilizer Unit are connected to the brush 13 through the coil of a current relay 3CR. The relay 3CR has a normally open contact 29.

The Control Unit includes a start switch SS and an inching switch SI, a relay 2CR, a solenoid SG for the valve which controls the supply of shielding gas to the gun and a solenoid SW for the valve which controls the supply of cooling water to the gun. In addition, there is a relay 4CR for controlling the inching. The relay 2CR has a pair of normally open contacts 31 and 33 and a normally closed contact 35. The relay 4CR has a pair of normally open contacts 37 and 39 and a pair of normally closed contacts 41 and 43.

With start switch SS closed, the coil of the relay 1CR in the Power Supply Unit is connected between conductors AL1 and AL2 through the start switch SS and normally closed contact 41 of the relay 4CR and is locked in through normally open contact 39. The coil of the relay 2CR is adapted to be connected between conductors AL1 and AL2 either through the start switch SS or a normally open contact 39 of the relay 4CR. The gas solenoid SG and the water solenoid SW are adapted to be connected between the conductors AL1 and AL2 through a normally open contact 33 of the relay 2CR. The coil of the relay 4CR is adapted to be connected between conductors AL1 and AL2 through the inching switch SI. In situations in which the apparatus includes a work table motor M1 for advancing this work under the arc, this motor is adapted to be connected between conductors AL1 and AL2 through normally closed contacts 43 of relay 4CR and contact 29 of relay 3CR.

The Motor is of the shunt type including an armature A, a shunt winding SF and a braking resistor RB. The shunt winding SF is supplied from conductors AL1 and AL2 through a rectifier. The braking resistor is connected across the armature A through normally closed contact 35 of the relay 2CR.

The Motor Circuit includes a thyratron 1TU having an anode 53, a cathode 55 and a control electrode 57. The anode 53 of the thyratron 1TU is connected through the conductor AL1 through the primary T3P of a transformer T3. The cathode 55 is adapted to be connected to the conductor AL2 through normally open contact 31 of the relay 2CR, the armature A of the motor and either through the normally open contact 29 of the relay 3CR or the normally open contact 37 of the relay 4CR.

In the control circuit of the motor, a composite potential is impressed. This composite potential includes, in addition to the armature potential, an A.C. bias component, a direct current component substantially proportional to the armature current, and the direct current component which may be set at the will of an operator. The A.C. bias is derived from the secondary T2S of a transformer T2. Across the secondary T2S a resistor 61 and a capacitor 63 are connected in parallel in a phase-shifting network. A variable resistor P3 is connected between the junction of the resistor 61 and the capacitor 63 and an intermediate terminal of the secondary T2S. The armature-current-proportional component is derived from the secondary T3S of a transformer T3 through a rectifier 65 including a filtering capacitor 67 on which the rectifier secondary potential of T3S is impressed. A variable resistor P4 is connected across the capacitor.

The adjustable potential which may be set at the will of an operator is derived from a capacitor C1 charged through a rectifier 71 from conductors AL1 and AL2. The potential impressed on the capacitor C1 is partially compensated for variations in the potential between conductors AL1 and AL2 by a network including a variable resistor P5 and regulator tube TR connected across capacitor C1. A variable resistor P2 through which the adjustable potential is impressed is connected between the setting arm 80 of the variable resistor P5 and the common junction of the regulator tube TR and capacitor C1 through a pair of resistors 75 and 77.

The control circuit of the thyratron 1TU extends from the control electrode 57 through a grid resistor 79, variable resistors P3, P4, P2, resistor 75 to AL2 and thence through normally open contacts 37 and 29 of relay 4CR or current relay 3CR, the armature A, the normally open contact 31 of the relay 2CR to the cathode. This current includes the adjustable potential component derivable from P2 which in turn is derived between the arm 80 of resistor P5 and the remote terminal of the tube TR and is partly compensated to an extent dependent on the setting of P5. The potentials of P4 and P2 are of such polarity as to counteract the potential component from the armature A. The armature-current-proportional potential component is set by P4 to compensate for the I-R drop across the armature.

In the stand-by condition of the apparatus, switches SS and SI are open. Relays 1CR, 2CR, 4CR and contactor M are then deenergized. The Power Supply Unit is then deenergized and the valves controlled by solenoids SG and SW are closed. In addition, the Motor Circuit is open and the motor is at rest. Field current is supplied to the winding SF of the Motor and the braking resistor RB is connected across the Motor.

Preparatory to a welding operation, the variable resistor P5 is set so that the most propitious partial compensation is effected. The proper setting of the resistor can be determined by varying the potential between AL1 and AL2, for example, with a variable transformer between ten percent above and ten percent below its normal potential and changing P5 until it is at a point at which the speed variation of the Motor is at a minimum, with potential between AL1 and AL2 at the two extreme settings respectively.

Once P5 is set, the electrode may be positioned near the work so that an arc may be struck by operation of the inching switch SI. The closing of the inching switch SI actuates relay 4CR. The normally closed contacts 41 and 43 of 4CR in series with the relay 1CR and the work table motor M1 are then opened to prevent energization of the Power Supply Unit and the latter motor. The normally open contact 39 of relay 4CR in the Motor Circuit is closed. In addition, the relay 2CR is actuated and its normally closed contact in the braking circuit is opened to disconnect the braking resistor RB from the armature A. The motor is then energized on each closure of the inching switch SI and the filler wire F is advanced toward the work W, and properly positioned.

When the electrode Z is properly positioned, the inching switch is left open and the starting switch SS is closed. The closing of the starting switch SS actuates the relays 1CR and 2CR. Actuation of the relay 1CR energizes the Stabilizer Unit and actuates the contactor M energizing the Power Supply Unit. Current then flows through the conductors 19 and 21, the electrodes Z and the work W and a welding arc is fired between the electrode and the work. The current relay 3CR is actuated, closing its contact 29 in the Motor Circuit. Where the apparatus is automatic and includes a movable work table 129 and a work table motor, the latter is also energized by the closing of contact 29. The actuation of the relay 2CR also energizes the solenoids SG and SW so that shielding gas and cooling water are supplied through the gun. In addition, the braking circuit of the armature A is opened and the armature is supplied with current through the thyratron 1TU. The magnitude of the current through the thyratron 1TU is determined by the potential component derived from resistor P4, the potential component derived from the resistor P2 and the potential across the armature A. The potential of P4 compensates for the I-R drop across the armature. The component derived from the variable resistor P2 determines the speed of the electrode. The welding now proceeds at the speed of the filler wire F set by the variable resistor P2. Adjustments in speed of five to one may be made by the operator by changing the setting of the variable resistor P2. The speed of the Motor is substantially constant. Where a work table motor is used, it also is energized by the closing of contact 29.

In making welds with this apparatus, it has been found that smooth uninterrupted welding takes place and that the welds produced are sound. Variations in the voltage between conductors AL1 and AL2 of plus or minus 10% have been found to produce variations of no more than plus or minus 3% in the motor speed over a speed range of 5 to 1.

While a preferred embodiment of this invention has been disclosed herein, many modifications thereof are feasible. For example, in its broader aspects this invention is applicable to consumable electrode welding. In such apparatus the motor feeding the consumable electrode is controlled in accordance with this invention. This invention, then, is not to be restricted except insofar as is necessitated by the spirit of the prior art.

We claim as our invention:

1. Apparatus for advancing fusible material towards work in the arc welding of said work with said material, comprising in combination a motor, an electric discharge device having an anode, a cathode and a control electrode, conductors for supplying an alternating-current potential, means connecting in series said conductors, said anode, said cathode and said motor, with said motor interposed between said cathode and one of said conductors, and means for impressing between said control electrode and said one of said conductors, a composite potential including an alternating current component displaced in phase with reference to the potentials between said conductors, a first direct-current component substantially proportional to the current conducted through said motor and a second direct-current component to be set at the will of an operator in accordance with the speed at which it is desired that said material shall be supplied, said second component being derivable from a first variable resistor energized from a regulating network including a rectifier and a capacitor connected between said conductors, and a second variable resistor and a regulator tube connected in parallel with said capacitor, said first variable resistor being connected between the variable arm of said second resistor and the one of said conductors to which said regulator tube is connected, and said second resistor being set at a point at which the speed of said electrode remains substantially constant in spite of substantial variation in the potential between said conductors.

2. Apparatus for advancing fusible material towards work in the arc welding of said work with said material comprising in combination, a motor, an electric discharge device having an anode, a cathode and a control electrode, conductors for supplying an alternating-current potential, means connecting in series said conductors, said anode, said cathode and said motor, with said motor interposed between said cathode and one of said conductors, and means for impressing between said control electrode and said one of said conductors, a composite potential including an alternating-current component displaced in phase with reference to the potentials between said conductors, a first direct-current component substantially proportional to the current conducted through said motor and a second direct-current component to be set at the will of an operator in accordance with the speed at which it is desired that said material shall be supplied, said second component being derivable from a first variable resistor energized from a regulating network including a rectifier and a capacitor connected between said conductors, with said capacitor electrically nearer said one conductor than said rectifier, and a second variable resistor and a regulator tube connected in parallel with said capacitor, said first variable resistor being connected between the variable arm of said second resistor and said one conductor and said second resistor being set at a point at which the speed of said electrode remains substantially constant in spite of substantial variation in the potential between said conductors.

3. Apparatus for arc welding work with fusible material fed by a direct-current motor energized from a single phase alternating current power supply, through an electric discharge device having an anode circuit through which the motor is supplied and a control circuit in which the potential across the motor is balanced against a direct-current potential including a first component proportional to the current conducted by the motor and a second component to be set at the will of an operator to set the speed at which said material is fed, the said apparatus being characterized by that the second component is derived from said single phase supply through a voltage compensating network which only partially compensates for variations in the voltage of said single phase power supply, the partial compensation being so set that said electrode is fed at a substantially constant speed at any setting of said second component in spite of substantial variations in the voltage of said single phase power supply.

4. Apparatus for arc welding work with fusible material fed by a direct-current motor energized from a single phase alternating-current power supply, through an electric discharge device having an anode circuit through which the motor is supplied and a control circuit in which the potential across the motor is balanced against a direct-current potential including a first component proportional to the current conducted by the motor and a second component set at the will of an operator to set the speed at which said material is fed, the said apparatus being characterized by that the second component is derived from said single phase supply through a voltage compensating network which only partially compensates for variations in the voltage of said single phase power supply, the partial compensation being so set that said electrode is fed at a substantially constant speed at any setting of said second component in spite of substantial variations in the voltage of said single phase power supply.

5. In combination, a first conductor and a second conductor from which alternating current is derivable, a direct-current motor, an electric discharge device having an anode, a cathode and a control electrode, means connecting in series said first conductor, said second conductor, said anode, said cathode and said motor with said motor connected between said cathode and said second conductor, means connected to said first and second conductors for deriving therefrom an alternating-current potential component displaced in phase with reference to the potential between said conductors, means connected to said anode and cathode for deriving therefrom a direct-current potential component substantially proportional to the current conducted by said motor, a rectifier, a capacitor, means connecting in series said first conductor, said second conductor, said rectifier and said capacitor with said capacitor electrically nearer said second conductor than said rectifier, a first variable resistor having a setting arm, a second variable resistor having a setting arm, a regulator tube, means connecting said first variable resistor and said regulator tube in shunt with said capacitor with said tube electrically nearer said second inductor than said first resistor, means connecting said second resistor between said setting arm of said first resistor and said second conductor and means for impressing in series between said control electrode and said setting arm for said second resistor, said phase displaced potential component and said direct-current component.

6. In combination, a first conductor and a second conductor from which alternating-current is derivable, a direct-current motor, an electric discharge device having an anode, a cathode and a contol electrode, means connecting in series said first conductor, said second conductor, said anode, said cathode and said motor with said motor connected between said cathode and said second conductor, means connected to said first and second conductors for deriving therefrom an alternating-current potential component displaced in phase with reference to the potential between said conductors, means connected to said anode and cathode for deriving therefrom a direct-current potential component substantially proportional to the current conducted by said motor, means connected to said first and second conductors for deriving another direct-current potential component, said last-named connected means including means for partially compensating for variations in the potential between said first conductor and said second conductor, and means for impressing in series between said control electrode and said second conductor, said phase-displaced potential component, said first-named direct-current potential component and said other direct-current potential component.

7. In combination, a first conductor and a second conductor from which alternating-current is derivable, a direct-current motor, an electric discharge device having an anode, a cathode and a control electrode, means connecting in series said first conductor, said second conductor, said anode, said cathode and said motor with said motor connected between said cathode and said second conductor, means connected to said first and second conductors for deriving therefrom, a periodic potential component having substantially the same period as the potential between said conductors, means connected to said anode and cathode for deriving therefrom a direct-current potential component substantially proportional to the current conducted by said motor, a rectifier, a capacitor, means connecting in series said first conductor, said second conductor, said rectifier and said capacitor with said capacitor electrically nearer said second conductor than said rectifier, a first variable resistor having a setting arm, a regulator tube, a second variable resistor having setting means, means connecting said first variable resistor and said regulator tube in shunt with said capacitor with said tube electrically nearer said second conductor than said first resistor, means connecting said second resistor between said setting arm of said first resistor and said second conductor, and means for impressing in series between said control electrode and said setting means for said second resistor, said periodic potential component and said direct-current component.

References Cited in the file of this patent

UNITED STATES PATENTS

| | | |
|---|---|---|
| 2,516,568 | Haneiko | July 25, 1950 |
| 2,629,850 | McLane | Feb. 24, 1953 |